United States Patent [19]

Hoppl et al.

[11] Patent Number: 5,002,376
[45] Date of Patent: Mar. 26, 1991

[54] DUAL STEREOMICROSCOPE

[75] Inventors: Josef K. Hoppl, Wantagh; Helmut A. Golda, Babylon, both of N.Y.

[73] Assignee: Edward Weck Incorporated, Princeton, N.J.

[21] Appl. No.: 351,225

[22] Filed: May 15, 1989

[51] Int. Cl.[5] .......................... G02B 21/22; G02B 5/04
[52] U.S. Cl. ..................................... 350/516; 350/286; 350/507; 350/515
[58] Field of Search ................. 350/414–415, 350/500–501, 507–536, 130–144, 286, 287

[56] References Cited

U.S. PATENT DOCUMENTS

| 3,170,983 | 2/1965 | Riedel | 350/515 |
|---|---|---|---|
| 3,173,984 | 3/1965 | Vogl | 350/515 |
| 3,186,300 | 6/1965 | Littmann | 350/516 |
| 3,434,777 | 3/1969 | Santirocco | 350/517 |
| 4,138,191 | 2/1979 | Peyman et al. | 350/516 |
| 4,167,302 | 9/1979 | Karasawa | 350/515 |
| 4,217,025 | 8/1980 | Takenaka | 350/515 |
| 4,277,130 | 7/1981 | Takahashi | 350/515 |
| 4,328,713 | 5/1982 | Lund | 350/515 |
| 4,341,435 | 7/1982 | Lang et al. | 350/515 |
| 4,365,871 | 12/1982 | Muchel | 350/414 |
| 4,436,384 | 3/1984 | Taira | 350/515 |
| 4,448,498 | 5/1984 | Muller et al. | 350/516 |
| 4,547,047 | 10/1985 | Koike et al. | 350/514 |
| 4,605,287 | 8/1986 | Lang et al. | 350/513 |
| 4,640,588 | 2/1987 | Tanaka | 350/516 |
| 4,657,356 | 4/1987 | Matsumura | 350/516 |

FOREIGN PATENT DOCUMENTS 1217099 5/1966 Denmark .

Primary Examiner—Bruce Y. Arnold
Assistant Examiner—Thong Nguyen
Attorney, Agent, or Firm—Robert E. Lee; Gene Warzecha

[57] ABSTRACT

A dual, stereoviewing operating microscope including a single objective lens adapted to provide a collimated beam of light which is intercepted and transversely redirected by a pair of reflecting prisms into two oppositely directed stereoscopic optical paths. Each stereoscopic optical path is provided with a pair of viewing eyepieces each of which has a zoom lens assembly. Each pair of eyepieces is independently operable of the other. The microscope also includes an aperture between the redirecting prisms intercepting the light from the objective lens in order to provide, through this aperture, a direct optical path between the objective lens and a camera or other recording device. A separate zoom lens assembly is inserted in this latter optical path and a mechanism is provided by which all zoom assemblies are simultaneously operable.

11 Claims, 3 Drawing Sheets

DUAL STEREOMICROSCOPE

BACKGROUND OF THE INVENTION

The present invention relates to dual stereomicroscopes, particularly for use in microsurgery.

Operating microscopes are well known in the art and are used in eye surgery and in plastic reconstruction surgery. During such surgery it is desirable to provide simultaneously two independent stereomicroscopes, one for the surgeon and one for an assistant. The surgeon and assistant should be able to see the same operating field with as nearly the same view as possible and with equal and maximum lighting without distortion or degradation due to differing optics in their respective microscopes. It is also desirable that each stereomicroscope have an independent zoom magnification capability since surgeon and assistant, at different phases of an operation, would need different magnification and field coverage to better suit their different tasks.

Further, it is desirable to provide for a separate microscope accessary port for use with a camera or video recorder which port has visual access to the operating field without replacing one of the microscopes.

In the Riedel patent, U.S. Pat. No. 3,170,983, two stereomicroscopes opposite one another are combined. Each stereomicroscope is complete including its own objective lens, but, to combine the two, it is necessary to add a pentagonal prism symmetrically located between the separate microscopes. See also Littman's patent, U.S. Pat. No. 3,186,300, where two stereomicroscopes, including objective lenses, also are combined with an arrangement of reflectors positioned symmetrically between the objective lenses.

In the Peyman et al patent, U.S. Pat. No. 4,138,191, a dual stereo viewing operating microscope which shares a common objective lens is provided. The two pairs of stereo tubes 21, 22 and 23, 24 intersect perpendicular planes i.e., the viewers using the microscopes are at right angles to one another, a configuration suitable for eye surgery but not for plastic reconstruction surgery. Although Peyman states that the lens cartridge 25 may comprise a plurality of variable magnification lens combinations or may be a "zoom" type lens structure to provide infinitely variable magnification, no structure such as gearing, motor, etc. is shown to provide independent zoom capability for both stereomicroscopes simultaneously.

While Peyman discloses the capability to add a camera to the microscope with access to the operating field, the camera 28 can only be effective with the use of prism 29 which switches the camera in by switching the stereoeyepieces 43 and 44 out. Hence, if the camera is to be used, the stereomicroscope is no longer a dual stereomicroscope.

In U.S. Pat. No. 4,341,435 (Lang et al), a stereoscopic microscope is disclosed that provides for multiple observation, so that surgical operations or other events may be observed simultaneously by two observers, or by one observer and a television apparatus. The two stereoeyepieces share a common light path, the viewing paths of the two pairs of stereo eyepieces intersect planes at right angles to one another, and, if a TV apparatus or camera is to be employed, the device no longer has a dual stereomicroscope capability.

In U.S. Pat. No. 4,605,287, also issued in the name of Lang et al, a surgical microscope for two surgeons is disclosed that uses beam splitting to effect the dual stereo capability.

SUMMARY OF THE INVENTION

The present invention provides an improved dual stereoviewing operating microscope in which the available viewing light is not divided by prisms or beam splitters, each stereoscopic viewing site is equipped with an independent zoom capability and a common objective lens is used by each stereoscopic pair of optics. A fifth optical path is provided with zoom capability to accommodate a camera or video accessory.

According to the invention, an objective lens provides a single collimated beam of light. First and second means intercept the collimated beam to cause first and second pairs of stereoscopically related observing beams. The first and second means include first and second pairs of zoom tubes, each pair independent of the other, for providing variable magnification of the operating area.

The first and second means each further include reflecting means for intercepting the collimated beam and directing the first and second pairs of light paths at angles transverse to the axis of the collimated light beam. The first and second zoom tubes in an advantageous embodiment all lie in a plane substantially perpendicular to the axis of the collimated beam.

The invention further provides for means intercepting the collimated beam to cause a fifth observing light path which also includes a zoom tube. Preferably, the zoom tube of the fifth path also lies in a plane substantially perpendicular to the axis of the collimated beam and parallel and spaced apart from the plane of the first and second pairs of zoom tubes.

DETAILED DESCRIPTION OF THE DRAWINGS

Figure 1:
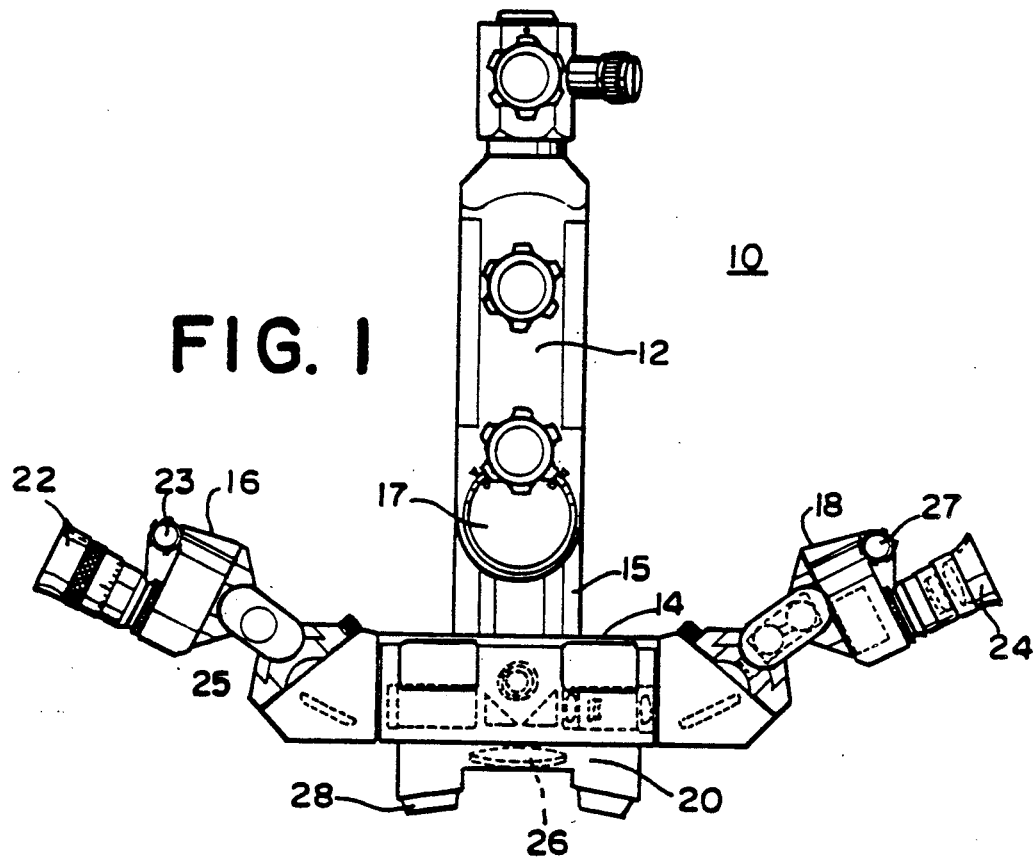
FIG. 1 is a front elevational view of the dual stereomicroscope of the present invention.
Figure 2:
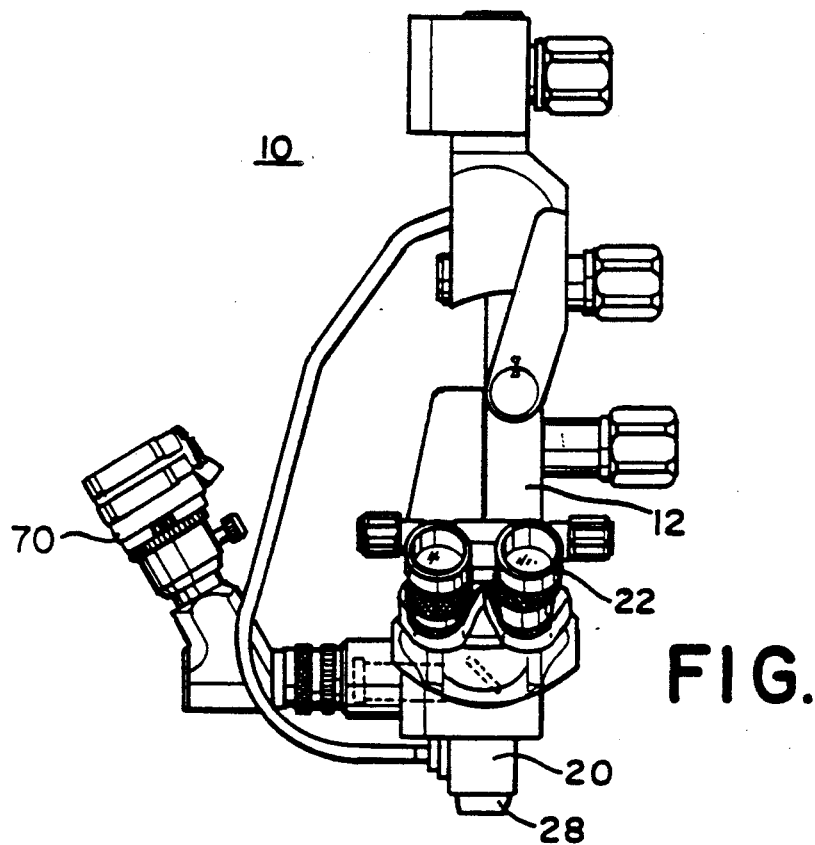
FIG. 2 is a side elevational view of the stereomicroscope of FIG. 1.
Figure 3:
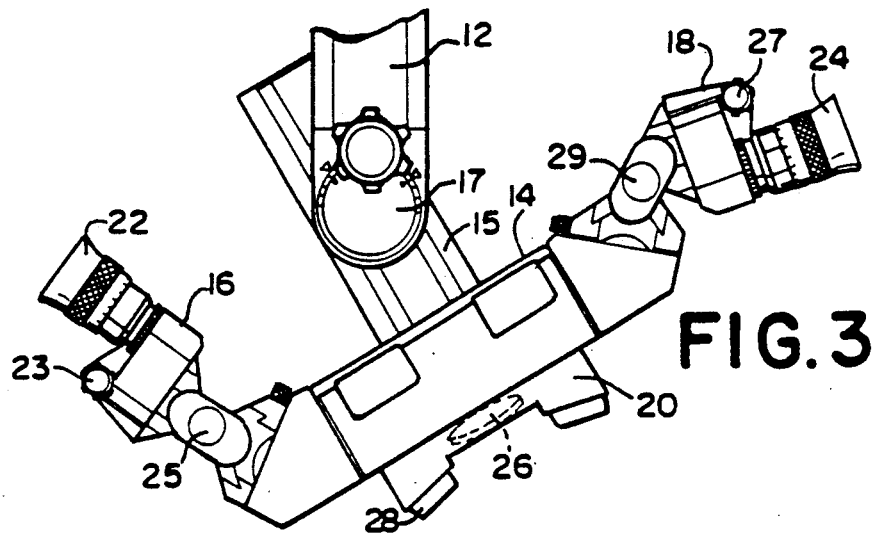
FIG. 3 is a portion of the stereomicroscope of FIG. 1 shown in a rotated position as compared with FIG. 1.

FIGS. 1-3 show the dual stereomicroscope designated generally 10 of the present invention. It comprises a vertical mounting body 12, a zoom tube housing 14 attached to the bottom of the body 12 by a straight member 15, a first stereo eye lens assembly 16 mounted on one side of the housing 14 and a second stereo eye lens assembly 18 attached to the opposite side of the housing 14. An objective lens housing 20 is attached to the bottom of the zoom tube housing 14.

The zoom tube housing 14 with its several attachments is rotatable about a rotation axis 17 in the vertical mounting body 12 in the direction of either stereo eye lens assembly. See FIG. 3. Rotation is possible to about 30°. The eye lens mounts 22 and 24 into which the surgeon or assistant looks to view the operating field can be moved independently to adjust for the convenience of the individual surgeon or user and to adjust for rotation of the zoom tube housing.

Referring now to all the FIGS., the objective lens housing 20 contains an achromatic objective lens 26 with a focal length of 8, 10 or 12 inches. Two illuminating sources such as fiber optic illuminator 28, illuminate the operating area at the focal plane of the objective lens. The reflected light is collimated by the objective lens 26 into a collimated beam directed into the zoom tube housing 14.

Two right angle reflecting prisms 30 and 32, one for each of two stereo lens assembles, are disposed parallel to one another above the objective lens 26 to intercept the collimated beam and direct first and second pairs of stereoscopically related observing light paths at right angles to the axis of the collimated beam.

A first pair of stereoscopically related light paths is directed toward the eye lens assembly 16 while the second pair of light paths is directed in the opposite direction to the second stereo eye lens assembly 18.

Each of the prisms 30 and 32 has a 45° right triangular elevational cross section and a generally rectangular base. A 45° edge 34 of prism 30 is parallel to a 45° edge 36 of prism 32 and each of the prisms 30 and 32 comprises a semi circular cut out 37 and 38, respectively, in the middle of the paralleled 45° edges which when taken together form a circular aperture 39 through the base of the prisms allowing a path of light from the collimated beam to pass through and not be reflected.

Within the zoom tube housing 14, a first pair of zoom tubes 40 and 42 lie in the path of the first pair of light paths from the reflector 30, while a second pair of zoom tubes 44 and 46 lie in the paths of the second pair of light paths from reflector 32. The zoom tubes provide variable magnification to the object being viewed by the light paths and light from the opposite ends of the zoom tubes is directed to the associated stereo eye lens assembly. Hence, dual stereomicroscopic capability with independent zoom tube capability is provided using a single objective lens and without the need for beam splitting. It will be noted that in the preferred embodiment the two pairs of zoom tubes lie in a common plane, substantially perpendicular to the axis of the collimated beam of light from the objective lens. The right angle reflecting prism 30 associated with the parallel zoom tubes 40 and 42 interrupts the collimated beam along a first line 50 while the right angle reflecting prism 32 associated with the zoom tubes 44 and 46 interrupts the collimated beam along a second line 52 parallel with line 50.

Figure 6:
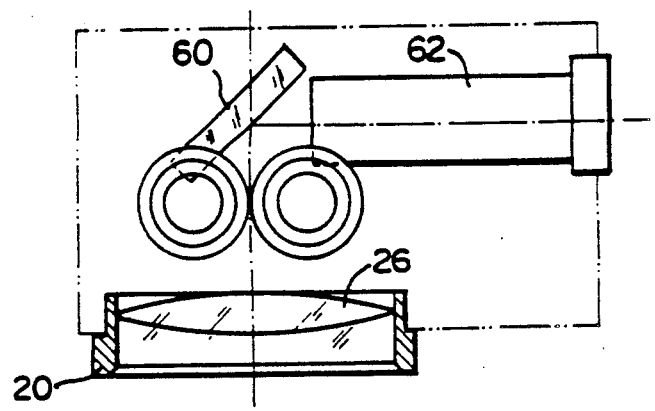
FIG. 6 is a side elevational schematic of the optics of FIG. 4.

A fifth path of light is created by the reflecting mirror 60 located above the reflecting prisms 30 and 32. See FIG. 6. The reflecting mirror 60 intercepts the path of light passing through the circular aperture 39 formed by the arcuate cut outs 37 and 38 of the reflecting prisms 30 and 32 and directs a fifth path of light at right angles to the axis of the collimated beam. A fifth zoom tube 62 is positioned along the fifth path forming a part thereof. The fifth zoom tube provides variable magnification for the fifth path.

In the preferred embodiment, the fifth path is a single path and is not stereoscopic. Such a single path is suitable, however, for use with an accessory such as a camera 70 in FIG. 2. The zoom tube for the fifth path lies in a plane parallel and spaced apart from the plane containing the first and second pairs of stereo zoom tubes, and the axis of the zoom tube for the fifth path is substantially perpendicular to the axis of the collimated beam.

While the reflectors 30, 32 and 60 are all right angle reflectors, they need not be. Other angles, such as 30° or 45° or 60° which are transverse to the axis of the collimated beam could also be used by choosing the appropriate reflectors.

Any known combination of lenses suitable for use as a zoom mechanism can be utilized in the zoom tubes shown in the FIGS. In one embodiment, the zoom tubes are 3 inch long cylindrical tubes with a 1 inch diameter circular cross section. An arrangement of compound lenses is shown dotted in zoom tube 44. It includes a pair of outer identical positive lenses 72 and 74 and a pair of inner identical negative lenses 76 and 78.

A gear ring is located around each cylindrical zoom tube. A motor and gear arrangement is provided for each pair of zoom tubes. As the motor turns, a gear on the end of the motor and shaft assembly engages the gear rings on the pair of zoom tubes rotating them in unison. Since there is an independent motor for each pair of zoom tubes, each stereoscopic viewing station has a separate zoom capability.

Figure 7:
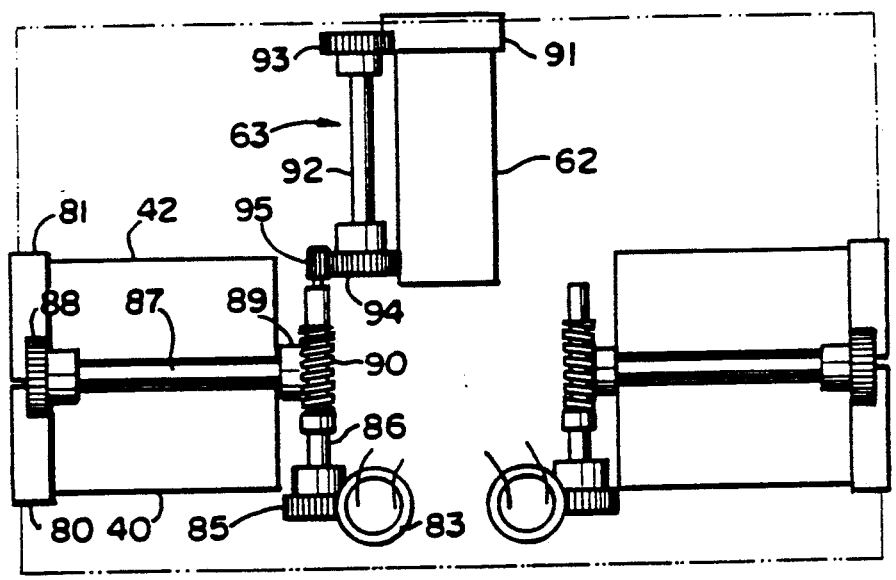
FIG. 7 is a top planar schematic of the optics and zoom drive of FIG. 4 showing the gear and motor assembly for driving the zoom optics of the stereomicroscope of FIGS. 1-6 in more detail.

On the embodiment shown in FIG. 7, the zoom tube 62 for the fifth path is slaved to the first zoom pair 40, 42 through the gearing arrangement 63. However, it is readily seen that a separate motor could be provided for the fifth zoom tube as well.

Figure 4:
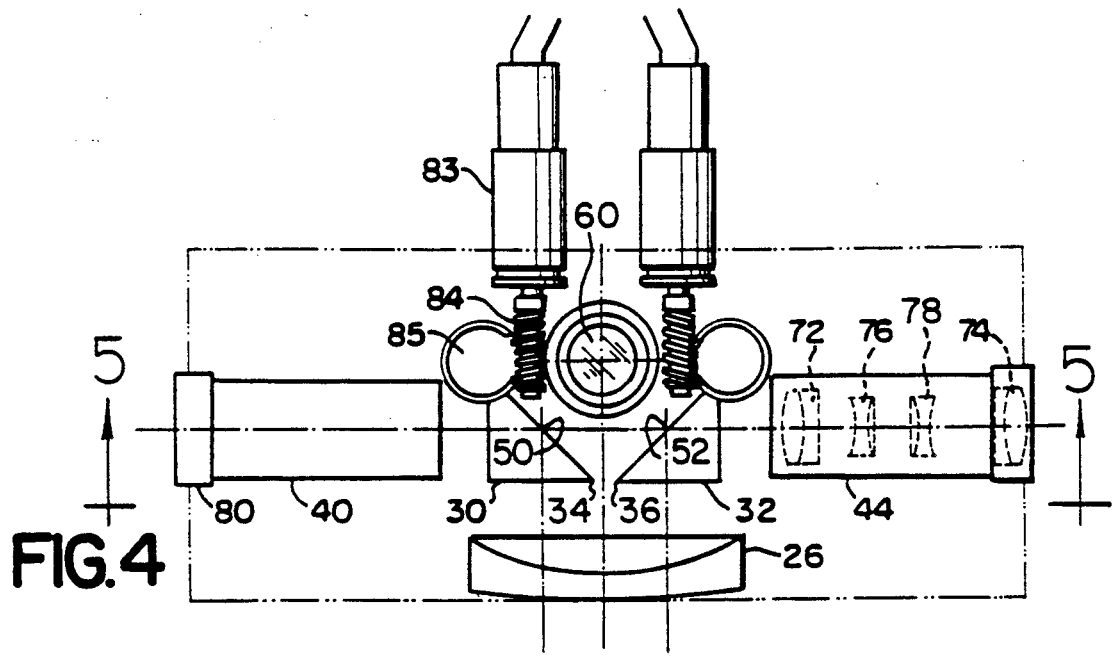
FIG. 4 is an enlarged front elevational schematic of a portion of the optics and zoom drive contained in the stereomicroscope of FIG. 1.
Figure 5:
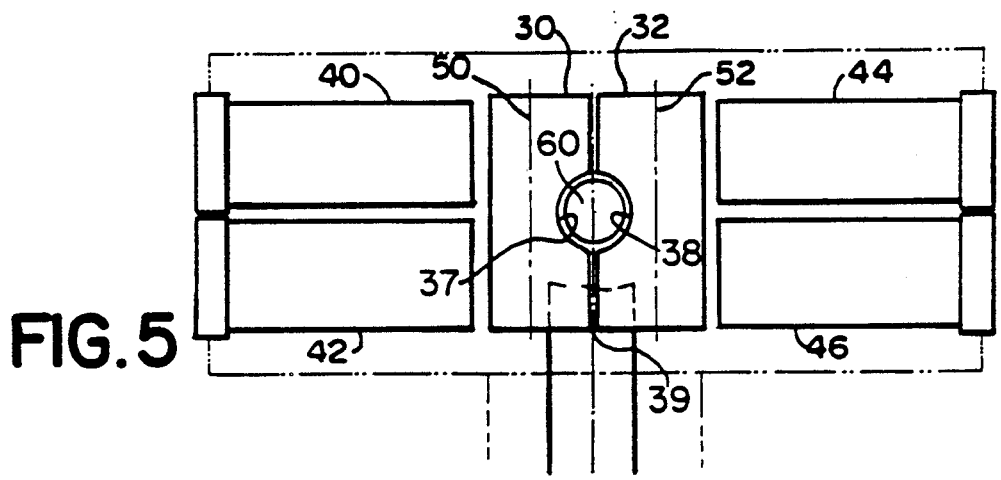
FIG. 5 is a bottom planar schematic of the optics of FIG. 4 taken along the line 5—5.

Referring now to FIGS. 4 and 7, a motor and gear arrangement is provided for each pair of zoom tubes. The arrangement for zoom tubes 40 and 42 will be discussed in detail. An identical gear and motor arrangement is provided for zoom tubes 44 and 46 but is not discussed in detail herein for simplicity. A gear ring is located around each cylindrical zoom tube, such as rings 80 and 81 for tubes 40 and 42, respectively. A motor 83 is mounted at least partially within the zoom tube assembly housing 14 with its axis generally parallel to the axis of the objective lens 26. A worm gear 84 is mounted to the end of the motor shaft and engages a mating gear ring 85 on shaft 86.

A second shaft 87 (not shown in FIG. 4) generally perpendicular to the shaft 86 extends parallel to the tubes 40 and 42 in a plane which is perpendicular to the plane of the tubes and which passes between the tubes. The second shaft 87 has a gear ring 88 at its distal end which matingly engages the gear rings 80 and 81. A gear ring 89 is attached to the shaft 87 at its opposite end and is disposed to be engaged by a worm gear 90 located along the midsection of the first shaft 86. When the motor is activated through the gearing just described, it turns shaft 87 which in turn rotates the gear rings 80 and 81. This in turn causes a change in magnification of the zoom by changing the relationship of the lenses inside the tube in accordance with well known principals of zoom lenses.

FIG. 7 further shows the fifth zoom tube 62 with gear ring 91 at its distal end. A third shaft 92 is positioned parallel to the tube 62 and alongside. It includes gear rings 93 and 94 at opposite ends with gear ring 93 matingly engaging gear ring 91 on the tube 62. The gear ring 94 is disposed to engage a gear 95 on the end of second shaft 86 opposite motor 83. While in the embodiment shown, the zoom lens associated with tube 62 is slaved to the zoom lens pair associated with tubes 40 and 42, a separate motor could be provided for the zoom lens associated with tube 62.

What is claimed is:

1. A dual stereomicroscope for performing microsurgery comprising:

an objective lens positioned to view an operating area and adapted to provide a collimated beam of light from said operating area;

first means intercepting and transversely directing said collimated beam of light from said objective lens for causing a first pair of stereoscopically related observing light paths;

a first pair of zoom lens assemblies operatively associated with said first pair of light paths for providing variable magnification;

second means intercepting and transversely directing said collimated beam of light from said objective lens for causing a second pair of stereoscopically related observing light paths; and a second pair of zoom lens assemblies operatively associated with said second pair of light paths for providing variable magnification;

third means intercepting said collimated beam of light for causing a fifth observing light path, said third means comprising reflecting means for continuously directing said fifth light path at an angle transverse to the axis of said collimated beam of light, and a fifth zoom lens assembly for providing variable magnification of said operating area, said fifth zoom lens assembly comprising a zoom tube lying in a plane substantially perpendicular to the axis of said collimated beam of light.

2. The dual stereomicroscope of claim 1 wherein said first means intercepts said collimated light beam along a first direction on a first side of said microscope and said second means intercepts said collimated light beam along a second direction on a side of said microscope opposite said first side.

3. The stereomicroscope of claim 1 wherein said first and second pairs of zoom lens assemblies each comprise a pair of zoom tubes and activating means coupled to said zoom tubes to vary the magnification of said zoom tubes.

4. The stereomicroscope of claim 3 wherein the zoom tube pairs of said first and second zoom lens assemblies lie in a plane substantially perpendicular to the axis of said collimated beam.

5. The stereomicroscope of claim 1 wherein said third means further comprises a fifth zoom lens assembly mechanically coupled with either said first or second pair of zoom lens assemblies.

6. The stereomicroscope of claim 5 where said fifth zoom tube is mechanically coupled to either said first or second pairs of zoom tubes.

7. The stereomicroscope of claim 1 wherein said fifth zoom tube lies in a plane parallel and spaced apart from the plane of said first and second pairs of zoom tubes.

8. The apparatus of claim 7 wherein the axis of said fifth zoom tube is substantially perpendicular to the axes of said first and second pairs of zoom tubes.

9. The apparatus of claim 8 wherein said first and second intercepting means comprises first and second right angle prisms, respectively, each right angle prism having an arcuate cut out at the center of adjacent 45° edges, which together form a circular aperture, and said reflecting means for said fifth light path comprises a reflecting mirror disposed at 45° to a line through the center of the circular aperture and normal thereto.

10. A dual stereomicroscope for performing microsurgery comprising:

an objective lens positioned to view an operating area and adapted to provide a collimated beam of light from said operating area;

first reflecting means intercepting and transversely directing said collimated beam of light from said objective lens for causing a first pair of stereoscopically related observing light paths;

second reflecting means intercepting and transversely directing said collimated beam of light from said objective lens for causing a second pair of stereoscopically related observing light paths;

third reflecting means intercepting and transversely directing said collimated beam of light from said objective lens for causing a fifth observing light path, said third reflecting means adapted to continuously enable said fifth observing light path.

11. The apparatus of claim 10 wherein said first and second intercepting means comprise first and second right angle prisms, respectively, each right angle prism having an arcuate cut out at the center of adjacent 45° edges which together form a circular aperture, and said third reflecting means comprises a reflecting mirror disposed at 45° to a line through the center of the circular aperture and normal thereto.

* * * * *